(12) United States Patent
Motohashi et al.

(10) Patent No.: US 11,097,419 B2
(45) Date of Patent: Aug. 24, 2021

(54) ROBOT SYSTEM

(71) Applicant: FANUC CORPORATION, Yamanashi (JP)

(72) Inventors: Masao Motohashi, Yamanashi (JP); Takahiro Kitano, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 299 days.

(21) Appl. No.: 16/172,136

(22) Filed: Oct. 26, 2018

(65) Prior Publication Data
US 2019/0126479 A1   May 2, 2019

(30) Foreign Application Priority Data

Oct. 31, 2017 (JP) .............................. JP2017-210350

(51) Int. Cl.
*B25J 9/16* (2006.01)
*B25J 13/08* (2006.01)
(Continued)

(52) U.S. Cl.
CPC ............ *B25J 9/1664* (2013.01); *B23K 11/00* (2013.01); *B25J 9/1638* (2013.01); *B25J 9/1694* (2013.01); *B25J 13/06* (2013.01); *B25J 13/085* (2013.01)

(58) Field of Classification Search
CPC ...... B25J 9/1664; B25J 9/1638; B25J 9/1694; B25J 13/06; B25J 13/085; B23K 11/00
See application file for complete search history.

(56) References Cited

U.S. PATENT DOCUMENTS

2012/0000891 A1*   1/2012   Nakanishi ............. B23K 11/115
                                                      219/86.7
2014/0183246 A1*   7/2014   Saitou .................. B23K 20/126
                                                       228/2.1
(Continued)

FOREIGN PATENT DOCUMENTS

CN    102039480    5/2011
CN    102139399    8/2011
(Continued)

OTHER PUBLICATIONS

Notification of Reasons for Refusal dated Aug. 20, 2019 in Japanese Patent Application No. 2017-210350.
(Continued)

*Primary Examiner* — Jeff A Burke
*Assistant Examiner* — Mohamad O El Sayah
(74) *Attorney, Agent, or Firm* — Wenderoth, Lind & Ponack, L.L.P.

(57) ABSTRACT

A robot system includes: an articulated type robot which retains a processing tool at an arm tip end portion and which includes a plurality of drive units that drive a plurality of drive axes; and a robot controller which controls the drive units so as to control a relative position of the processing target and the processing tool and the robot controller includes: a torque information detection unit which detects torque information on the torques of the drive units; a contact position estimation unit which estimates, based on the change of tendency of a variation in the detected torque information of at least one of the drive units, a contact position in which the processing target and the processing tool make contact with each other; and a position compensation unit which compensates the target position of the robot based on the estimated contact position.

7 Claims, 9 Drawing Sheets

(51) Int. Cl.
   *B23K 11/00* (2006.01)
   *B25J 13/06* (2006.01)

(56) References Cited

U.S. PATENT DOCUMENTS

| | | | | |
|---|---|---|---|---|
| 2016/0375588 | A1* | 12/2016 | Ueberle | B25J 13/085 |
| | | | | 700/258 |
| 2018/0133897 | A1* | 5/2018 | Shimizu | B25J 9/1674 |
| 2019/0022859 | A1* | 1/2019 | Ogawara | B25J 9/1635 |

FOREIGN PATENT DOCUMENTS

| | | |
|---|---|---|
| CN | 102310258 | 1/2012 |
| CN | 106862742 | 6/2017 |
| DE | 60219710 T2 | 8/2007 |
| DE | 69936073 T2 | 8/2007 |
| DE | 102010048961 A1 | 8/2011 |
| DE | 102016117038 A1 | 3/2017 |
| EP | 1660268 B1 | 1/2012 |
| EP | 2679329 A2 | 1/2014 |
| JP | 11-129076 | 5/1999 |
| JP | 2001-105153 | 4/2001 |
| JP | 2001-150150 | 6/2001 |
| JP | 2011-88175 | 5/2011 |
| JP | 2011-152582 | 8/2011 |
| JP | 2012-11403 | 1/2012 |
| JP | 2016-203304 | 12/2016 |

OTHER PUBLICATIONS

Office Action dated Nov. 2, 2020 in DE Patent Application No. DE102018218289.2.
Office Action dated Jan. 19, 2021 in CN Patent Application No. 201811269274.5.

\* cited by examiner

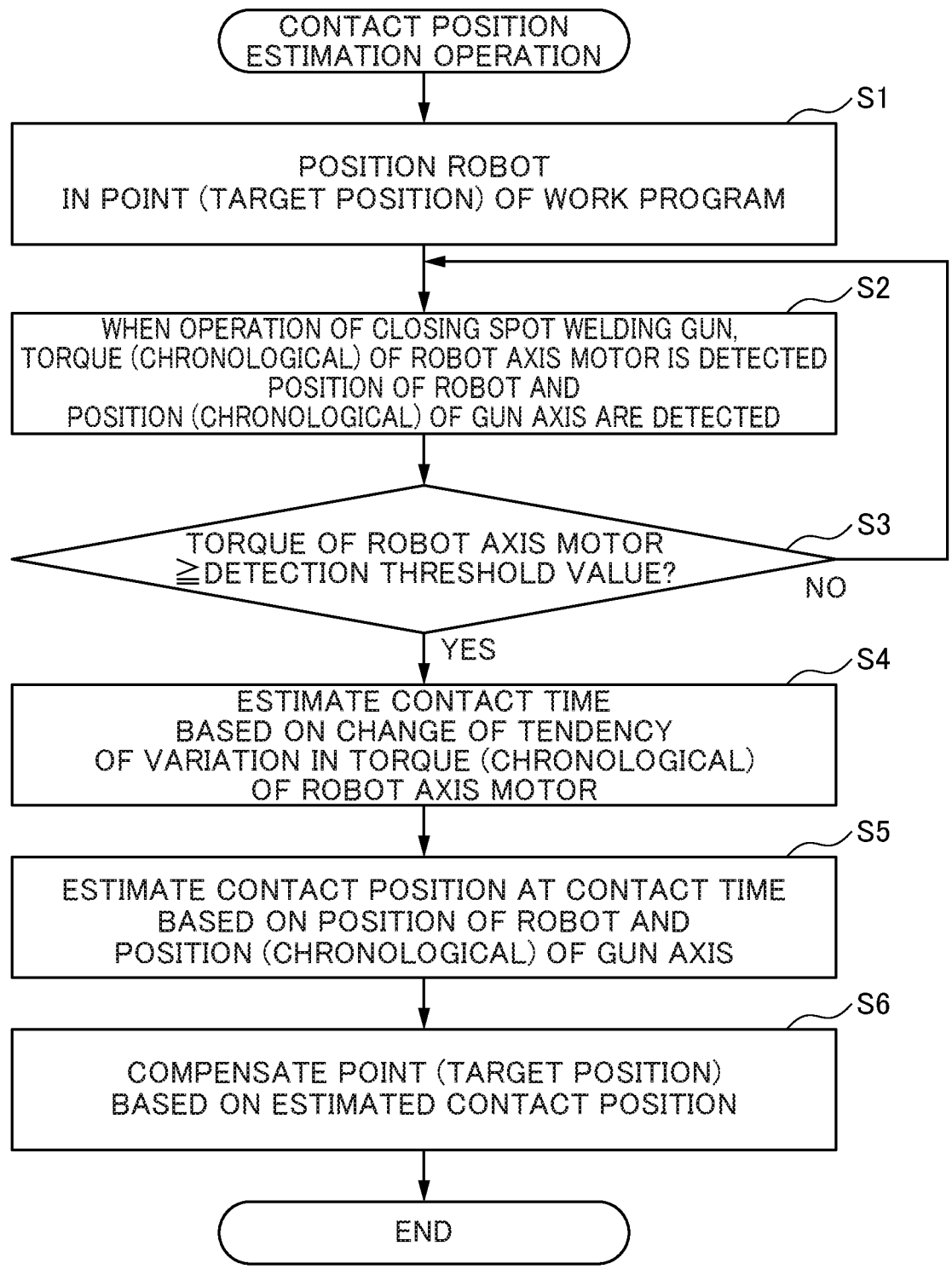

ROBOT SYSTEM

This application is based on and claims the benefit of priority from Japanese Patent Application No. 2017-210350, filed on 31 Oct. 2017, the content of which is incorporated herein by reference.

BACKGROUND OF THE INVENTION

Field of the Invention

The present invention relates to a robot system which brings a processing tool into contact with a target to be processed so as to perform predetermined processing on the target to be processed.

Related Art

Patent documents 1 to 4 disclose a spot welding system (robot system) which brings a spot welding gun (processing tool) into contact with a workpiece (target to be processed) so as to perform spot welding (predetermined processing) on the workpiece. This spot welding system includes: the spot welding gun which has a movable electrode driven by a gun axis motor and an opposite electrode that is arranged opposite the movable electrode; an articulated type robot which retains the spot welding gun at an arm tip end portion and which is driven by a plurality of robot axis motors. The spot welding system uses a robot to relatively move the workpiece and the spot welding gun, thereafter closes the movable electrode and the opposite electrode of the spot welding gun toward the point of the workpiece, sandwiches the workpiece between the movable electrode and the opposite electrode and applies a voltage between both the electrodes so as to perform the spot welding.

In the spot welding system as described above, when a teaching position or the workpiece position (spot welding point) of an operation program (work program) of the robot or the spot welding gun is displaced from an actual workpiece position, an overload acts on the workpiece so as to deform the workpiece, with the result that the quality of the welding may be lowered. In order to avoid such a situation, the spot welding system disclosed in patent documents 1 to 4 detects contact of the workpiece and the electrode of the spot welding gun so as to compensate the target position (the workpiece position of the operation program) of the spot welding gun.

When the electrode and the workpiece make contact with each other while an operation of closing the spot welding gun is being performed, the tendency of a variation (an inclination, the amount of variation in torque per unit time) in the torque characteristic of the gun axis motor is changed (increased). The spot welding system disclosed in patent documents 1 and 2 focuses on this property, and monitors the torque of the gun axis motor while the operation of closing the spot welding gun is being performed, estimates the contact position of the electrode and the workpiece from the change of the tendency of the variation in the torque characteristic and compensates the target position (the workpiece position of the operation program) of the spot welding gun based on the estimated contact position.

When the electrode and the workpiece make contact with each other while the operation of closing the spot welding gun is being performed, the torque of the robot axis motor is also changed (increased or decreased). The spot welding system disclosed in patent documents 3 and 4 focuses on this property, and monitors the torque of the robot axis motor while the operation of closing the spot welding gun is being performed and compensates the target position (the workpiece position of the operation program) of the spot welding gun based on a time or a position when the torque reaches a threshold value.

Patent Document 1: Japanese Unexamined Patent Application, Publication No. 2011-88175
Patent Document 2: Japanese Unexamined Patent Application, Publication No. 2011-152582
Patent Document 3: Japanese Unexamined Patent Application, Publication No. 2001-150150
Patent Document 4: Japanese Unexamined Patent Application, Publication No. 2012-11403

SUMMARY OF THE INVENTION

In the spot welding system disclosed in patent documents 1 and 2, the torque information of a gun axis is used to detect contact of a welding electrode and the workpiece. In the method of using the torque information of the gun axis as described above, it is necessary to bring the movable electrode and the workpiece into contact with each other without fail, and when the opposite electrode and the workpiece make contact with each other, it is impossible to detect the contact. In a spot welding system which individually includes a controller for controlling a robot axis and a controller for controlling a gun axis, a delay occurs when the torque information of the gun axis is referenced from the robot controller.

In the spot welding system disclosed in patent documents 3 and 4, whether or not the motor torque reaches the threshold value is monitored but the change of the tendency of the variation in the motor torque characteristic, that is, the instant of contact of the electrode and the workpiece is not monitored unlike the spot welding system disclosed in patent documents 1 and 2, with the result that as compared with the spot welding system disclosed in patent documents 1 and 2, the accuracy of the detection of the contact position is lowered.

An object of the present invention is to provide a robot system which uses the torque information of a robot axis so as to accurately detect a contact position of a processing tool and a target to be processed.

(1) A robot system (for example, a spot welding system 1 which will be described later) according to the present invention is a robot system which brings a processing tool (for example, a spot welding gun 20 which will be described later) into contact with a target to be processed (for example, a workpiece W which will be described later) so as to perform predetermined processing (for example, spot welding which will be described later) on the target to be processed, the robot system includes: an articulated type robot (for example, a robot 10 which will be described later) which retains the target to be processed or the processing tool at an arm tip end portion (for example, an arm tip end portion 14 which will be described later) and which includes a plurality of drive units (for example, robot axis motors 15 which will be described later) that drive a plurality of drive axes (for example, robot axes J1 to J6 which will be described later); and a robot controller (for example, a robot controller 30 which will be described later) which controls, based on a target position of the robot, the drive units of the robot so as to control a relative position of the target to be processed and the processing tool and the robot controller includes: a torque information detection unit (for example, a torque information detection unit 33 which will be described later) which detects torque information on the torques of the drive units in the robot; a contact position estimation unit (for example, a contact position estimation unit 34 which will be described later) which estimates, based on a change of tendency of a variation in the torque information of at least one of the drive units detected in the torque information detection unit, a contact position in which the target to be processed and the processing tool make contact with each other; and a position compensation unit (for example, a position compensation unit 35 which will be described later) which compensates the target position of the robot based on the contact position estimated in the contact position estimation unit.

(2) In the robot system described in (1), the drive axes of the robot may include a wrist axis (for example, wrist axes J4 to J6 which will be described later) on the side of the arm tip end portion and a basic axis (for example, basic axes J1 to J3 which will be described later) on the side opposite to the arm tip end portion, the robot controller may further include: a torque restriction unit (for example, a torque restriction unit 36 which will be described later) which restricts at least one of the torques of the drive units; and a control method switching unit (for example, a control method switching unit 37 which will be described later) which estimates, based on the posture of the robot in the target position, an S/N ratio between moment S that is received by the drive axes when the target to be processed and the processing tool make contact with each other and a fluctuation N that is produced in the drive axes, and which switches control methods based on the estimated S/N ratio and when a drive axis is present in which the estimated S/N ratio is equal to or more than a first switching threshold value, the control method switching unit may estimate the contact position of the target to be processed and the processing tool with the contact position estimation unit, and may compensate the target position of the robot with the position compensation unit whereas when the drive axis is not present in which the estimated S/N ratio is equal to or more than the first switching threshold value, the control method switching unit may restrict the torque of the basic axis with the torque restriction unit.

(3) In the robot system described in (2), when the drive axis is not present in which the estimated S/N ratio is equal to or more than the first switching threshold value, and a basic axis is present in which the estimated S/N ratio is equal to or more than a second switching threshold value, the control method switching unit may restrict the torque of the basic axis with the torque restriction unit.

(4) The robot system described in (3) may further include: a notification unit (for example, a notification unit 38 which will be described later) which provides an alarm notification, and when the drive axis is not present in which the estimated S/N ratio is equal to or more than the first switching threshold value, and the basic axis is not present in which the estimated S/N ratio is equal to or more than the second switching threshold value, the control method switching unit may make the notification unit provide the alarm notification.

(5) In the robot system described in any one of (1) to (4), the change of the tendency of the variation in the torque information may be a change of the amount of variation in the torque information per unit time.

(6) In the robot system described in any one of (1) to (5), the torque information may be the torques or drive currents of the drive units.

(7) In the robot system described in any one of (1) to (6), the robot system may be a spot welding system which includes a spot welding gun as the processing tool and which performs spot welding on a workpiece serving as the target to be processed.

According to the present invention, it is possible to provide a robot system which uses the torque information of a robot axis so as to accurately detect a contact position of a processing tool and a target to be processed.

BRIEF DESCRIPTION OF THE DRAWINGS

FIG. 3 is a flowchart of a contact position estimation operation performed by the robot controller according to the first embodiment;

DETAILED DESCRIPTION OF THE INVENTION

Figure 1:
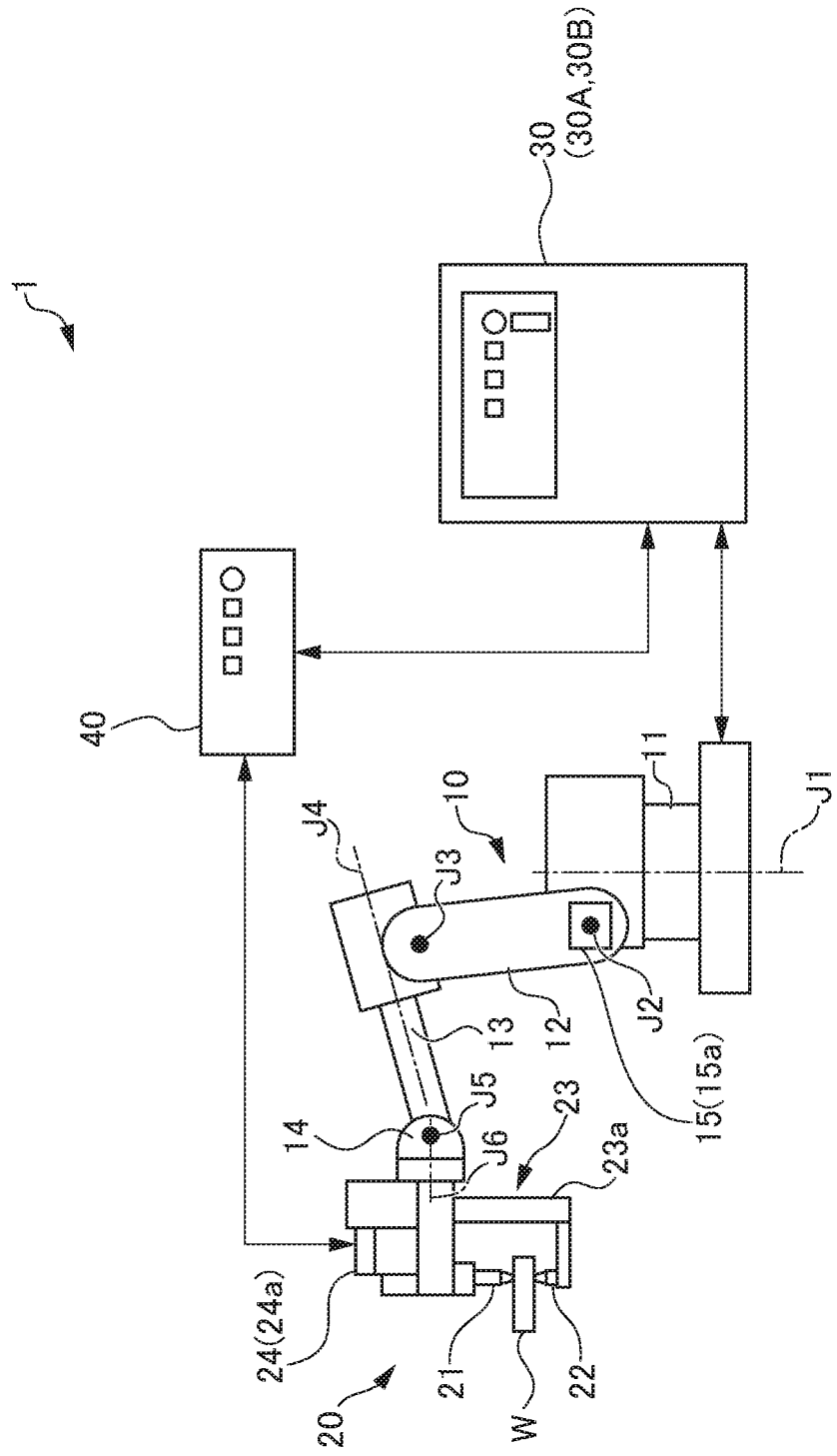
FIG. 1 is a diagram showing the configuration of a spot welding system according to the present embodiment.

A spot welding system will be described below as an example of an embodiment of a robot system according to the present invention with reference to accompanying drawings. In the drawings, the same or corresponding parts are identified with the same reference numerals.
(Spot Welding System: Robot System)

FIG. 1 is a diagram showing the configuration of a spot welding system according to the present embodiment. The spot welding system 1 shown in FIG. 1 uses a robot 10 so as to relatively move a spot welding gun 20 and a workpiece W, and brings the spot welding gun 20 into contact with the workpiece W so as to perform spot welding on the workpiece W. The spot welding system 1 includes the robot 10, the spot welding gun 20, a robot controller 30 which controls the operation of the robot 10 and a welding gun controller 40 which controls the operation of the spot welding gun 20.

The robot 10 is, for example, a six-axis vertical articulated type robot, and includes a base 11, a lower arm 12, an upper arm 13 and an arm tip end portion 14. The base 11 is installed on a floor. One end side of the lower arm 12 is coupled to the top of the base 11 such that the lower arm 12 can be rotated about a first axis (vertical axis) J1 and can also be rotated about a second axis (horizontal axis) J2. One end side of the upper arm 13 is coupled to the other end side of the lower arm 12 such that the upper arm 13 can be rotated about a third axis (horizontal axis) J3. The arm tip end portion 14 is coupled to the other end side of the upper arm 13 such that the arm tip end portion 14 can be rotated about a fourth axis J4 perpendicular to the third axis J3 and can also be rotated about a fifth axis J5 perpendicular to the fourth axis J4. The spot welding gun 20 is attached to the arm tip end portion 14 such that the spot welding gun 20 can be rotated about a sixth axis J6 perpendicular to the fifth axis J5. The robot 10 is not limited to the six-axis vertical articulated type, and as long as the spot welding gun 20 and the workpiece W can be relatively moved, an articulated type robot of another type such as a four-axis vertical articulated type robot may be adopted.

The robot 10 incorporates a plurality of servo motors 15 which individually drive a plurality of drive axes, that is, the first to sixth axes J1 to J6 (for convenience, only one is illustrated). The servo motors 15 are driven by control signals from the robot controller 30, and the position and the posture of the spot welding gun 20 are changed by the drive of the servo motors 15.

In the following description, the first to sixth axes J1 to J6 in the robot 10 are also referred to as robot axes, and the servo motors 15 for driving these robot axes are also referred to as robot axis motors. The first axis J1, the second axis J2 and the third axis J3 which are a vertical axis or a horizontal axis are also referred to as basic axes, and the fourth axis J4, the fifth axis J5 and the sixth axis J6 are also referred to as wrist axes. The basic axes J1 to J3 which are a vertical axis or a horizontal axis mainly contribute to the positioning of the arm tip end portion 14 of the robot 10. On the other hand, the wrist axes J4 to J6 mainly contribute to the posturing of the arm tip end portion 14 of the robot 10.

The spot welding gun 20 is a so-called C-type spot welding gun. The spot welding gun 20 includes a C-shaped gum arm 23 which is coupled to the arm tip end portion 14 and a servo motor 24 for sandwiching the workpiece. The gum arm 23 includes: a rod-shaped opposite electrode 22 which is provided so as to protrude from an end portion of a L-shaped frame 23a; and a rod-shaped movable electrode 21 which is provided opposite the opposite electrode 22 so as to protrude. The movable electrode 21 and the opposite electrode 22 are arranged on the same axis. The opposite electrode 22 is fixed to the frame 23a whereas the movable electrode 21 can be moved relatively with respect to the frame 23a on the same axis as the opposite electrode 22.

The servo motor 24 is driven by a control signal from the welding gun controller 40, and the movable electrode 21 approaches the opposite electrode 22 and separates from the opposite electrode 22 by the drive of the servo motor 24. The workpiece W is sandwiched between the movable electrode 21 and the opposite electrode 22 in the direction of plate thickness, and spot welding on the workpiece W is performed. The workpiece W is supported with an unillustrated workpiece support device.

In the following description, the axis of the relative movement of the movable electrode 21 and the opposite electrode 22 in the spot welding gun 20 is also referred to as a gun axis, and the servo motor 24 for driving the gun axis is also referred to as a gun axis motor.

In each of the servo motors 15 for the robot axes, an encoder 15a is provided, and the rotation angles of the servo motors 15 around the axes are detected by the encoders 15a. The detected rotation angles are fed back to the robot controller 30, and the position and the posture of the spot welding gun 20 at the arm tip end portion 14 are controlled by feedback control in the robot controller 30. In this way, the opposite electrode 22 integral with the frame 23a can be positioned in a teaching position in the direction of the plate thickness of the workpiece W, and the position and the posture of the opposite electrode 22 can be detected by signals from the encoders 15a.

In the gun axis servo motor 24, an encoder 24a is provided, and the rotation angle of the servo motor 24 about the axis is detected by the encoder 24a. The detected rotation angle is fed back to the welding gun controller 40, and the movable electrode 21 can be positioned with respect to the opposite electrode 22 by feedback control in the welding gun controller 40. Although the amount of opening between the electrodes 21 and 22 is changed according to the rotation angle of the servo motor 24, in the present embodiment, the rotation angle of the servo motor 24 when the movable electrode 21 is brought into contact with the opposite electrode 22, that is, when the amount of opening is zero is previously set to a reference value. In this way, the rotation angle from the reference value can be detected by a signal from the encoder 24a, and thus it is possible to detect the amount of opening between the electrodes 21 and 22.

Each of the robot controller 30 and the welding gun controller 40 is formed to include a computation processing device which includes a CPU, a ROM, a RAM, another peripheral circuit and the like. The robot controller 30 and the welding gun controller 40 are connected to each other so as to transmit and receive (communicate) signals to and from each other.

The robot controller 30 stores an operation program (work program), teaching data and the like of the robot 10 and the spot welding gun 20. In the teaching data, welding point data indicating the positions and postures of the robot 10 and the spot welding gun 20 when the spot welding is performed on the workpiece W at a large number of welding places is included. Based on the teaching data, the work program for an automatic operation is produced.

At the time of the automatic operation, the robot controller 30 operates the robot 10 according to the work program, and controls the position and the posture of the spot welding gun 20 with respect to the workpiece W so as to arrange the workpiece W between the electrodes 21 and 22. The welding gun controller 40 operates the movable electrode 21 according to the work program, and controls a pressure force which is produced by the electrodes 21 and 22 and which is applied to the workpiece W and controls a current supplied to the electrodes 21 and 22 according to the work program so as to perform the spot welding in a predetermined welding point.

Before the automatic operation, when an operation of closing the spot welding gun 20 is performed, the robot controller 30 detects the contact position of the electrode 21 or 22 and the workpiece W. Based on the contact position, the robot controller 30 compensates the target position (point) in the work program. The robot controller 30 will be described in detail below.

(Robot Controller According to First Embodiment)

Figure 2:
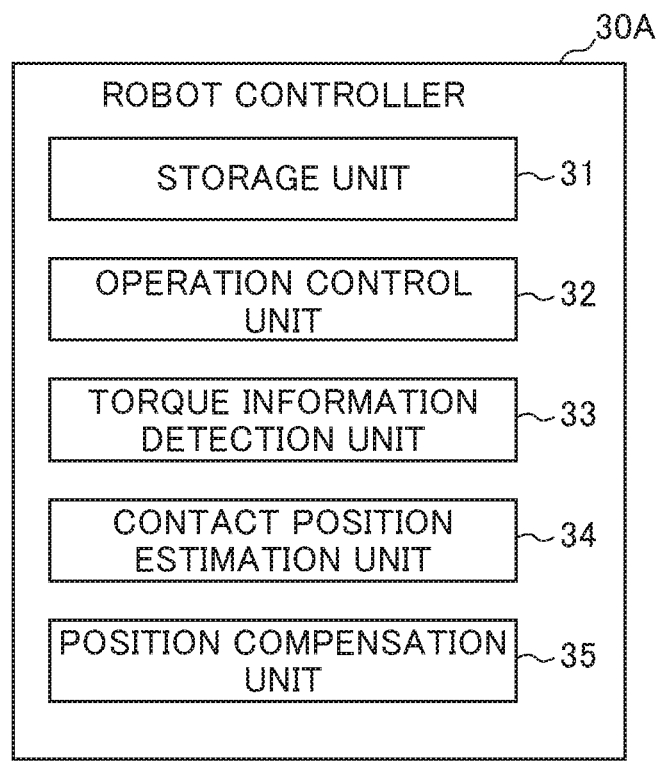
FIG. 2 is a robot controller shown in FIG. 1 and is a diagram showing the configuration of a robot controller according to a first embodiment.

FIG. 2 is a diagram showing the configuration of a robot controller according to a first embodiment. A robot controller 30A shown in FIG. 2 is applied to the robot controller 30 in the spot welding system 1 shown in FIG. 1. The robot controller 30A includes a storage unit 31, an operation control unit 32, a torque information detection unit 33, a contact position estimation unit 34 and a position compensation unit 35.

The storage unit 31 is a rewritable memory such as an EEPROM. As described previously, the storage unit 31 stores the operation program (work program), the teaching data and the like of the robot 10 and the spot welding gun 20. In the teaching data, the welding point data indicating the positions and postures of the robot 10 and the spot welding gun 20 when the spot welding is performed on the workpiece W at a large number of welding places is included. The teaching data is input by a teacher with a teach pendant (not shown) or the like. Based on the teaching data, the work program for the automatic operation is produced. The storage unit 31 associates the chronological data of the torques of the robot axis motors 15 detected in the torque information detection unit 33 which will be described later with the chronological data of the position of the robot 10 and the chronological data of the position of the gun axis so as to store the data.

At the time of the automatic operation or before the automatic operation, the operation control unit 32 operates the robot 10 according to the work program stored in the storage unit 31. Specifically, the operation control unit 32 calculates an operation command based on the target position (point) and the feedback from the encoders 15a of the robot axis motors 15, and drives and controls the robot axis motors 15. In this way, the operation control unit 32 controls the position and the posture of the spot welding gun 20 with respect to the workpiece W so as to arrange the workpiece W between the electrodes 21 and 22.

When the operation of closing the spot welding gun 20 is performed with the welding gun controller 40 according to the work program before the automatic operation, the torque information detection unit 33 detects the torques of a plurality of the robot axis motors 15. Specifically, the torque information detection unit 33 acquires the chronological data of the torques of the robot axis motors 15. Here, the torque information detection unit 33 acquires the chronological data of the feedback from the encoder 15a of the robot axis motors 15 and the encoder 24a of the gun axis motor 24. In other words, the torque information detection unit 33 acquires the chronological data of the position of the robot 10 and the chronological data of the position of the gun axis. The torque information detection unit 33 associates the chronological data of the torques of the robot axis motors 15 with the chronological data of the position of the robot 10 and the chronological data of the position of the gun axis so as to temporarily store the data in the storage unit 31. The torque information detection unit 33 may detect drive currents instead of the torques of the robot axis motors 15.

Before the automatic operation, based on the change of the tendency of a variation (an inclination, the amount of variation per unit time) in a torque characteristic based on the chronological data of the torques of the robot axis motors 15 which is detected in the torque information detection unit 33 and which is temporarily stored in the storage unit 31, the contact position estimation unit 34 estimates the contact position in which the workpiece W and the spot welding gun 20 make contact with each other. Specifically, the contact position estimation unit 34 estimates a contact time based on the change of the tendency of a variation in the torque characteristic. The contact position estimation unit 34 estimates, as the contact position, the position of the robot 10 and the position of the gun axis corresponding to the estimated contact time from the chronological data of the position of the robot 10 and the chronological data of the position of the gun axis which are detected in the torque information detection unit 33 and which are temporarily stored in the storage unit 31.

Based on the contact position estimated in the contact position estimation unit 34, the position compensation unit 35 compensates the target position (point) in the work program. For example, before the automatic operation, the position compensation unit 35 may compensate the target position (point) in the work program stored in the storage unit 31. Alternatively, during the automatic operation, the position compensation unit 35 may compensate the target position (point) in the work program so as to compensate the operation command calculated in the operation control unit 32.

Figure 4A:
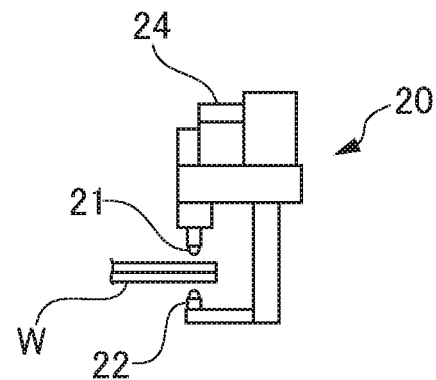
FIG. 4A is a diagram showing a state where a robot is positioned by the robot controller such that the spot welding gun is arranged in the point of a workpiece.
Figure 4B:
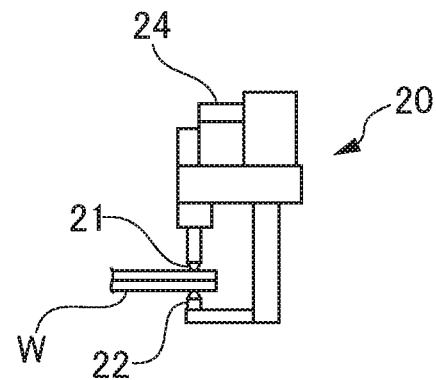
FIG. 4B is a diagram showing a state where the electrode of the spot welding gun is brought into contact with the point of the workpiece by a welding gun controller.
Figure 5:
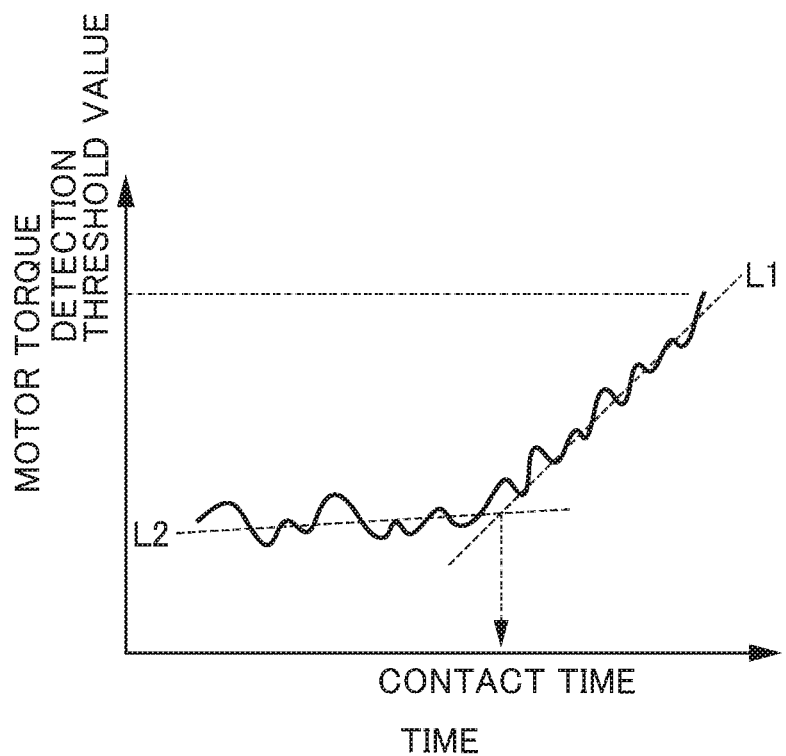
FIG. 5 is a schematic view showing the torque characteristic of a robot axis motor.

A contact position estimation operation before the automatic operation performed by the robot controller 30A according to the first embodiment will then be described with reference to FIGS. 3 to 5. FIG. 3 is a flowchart of the contact position estimation operation performed by the robot controller 30A according to the first embodiment. FIG. 4A is a diagram showing a state where the robot 10 is positioned by the robot controller 30A such that the spot welding gun 20 is arranged in the point of the workpiece W. FIG. 4B is a diagram showing a state where the electrodes 21 and 22 of the spot welding gun 20 are brought into contact with the point of the workpiece W by the welding gun controller 40. FIG. 5 is a schematic view showing the torque characteristic of the robot axis motor 15

The operation control unit 32 first operates the robot 10 according to the work program so as to relatively move the workpiece W and the spot welding gun 20, and positions, as shown in FIG. 4A, the robot 10 such that the spot welding gun 20 is arranged in the point (target position) of the workpiece W (S1). Here, the spot welding gun 20 is in a state where the spot welding gun 20 is opened.

Then, the robot controller 30A controls the welding gun controller 40 so as to start the operation of closing the spot welding gun 20 according to the work program. At that time, the torque information detection unit 33 detects the torques of the robot axis motors 15 as the chronological data. Here, the torque information detection unit 33 detects, as the chronological data, the feedback from the encoders 15a of the robot axis motors 15 and the encoder 24a of the gun axis motor 24, that is, the position of the robot 10 and the position of the gun axis. The torque information detection unit 33 associates, with each other, the chronological data of the torques of the encoders 15a of the robot axis motors 15 and the chronological data of the position of the robot 10 and the chronological data of the position of the gun axis which are detected so as to temporarily store the data in the storage unit 31 (S2).

Then, the contact position estimation unit 34 determines, based on the chronological data of the torques of the robot axis motors 15 temporarily stored in the storage unit 31, whether or not the torque of any of the robot axis motors 15 is equal to or more than a detection threshold value (S3). When the torques of all the robot axis motors 15 are less than the detection threshold value, the contact position estimation unit 34 determines that the electrode 21 or 22 and the workpiece W have not made contact with each other yet, and the process returns to step S2.

When as shown in FIG. 5, the torque of any of the robot axis motors 15 is equal to or more than the detection threshold value, the contact position estimation unit 34 determines that as shown in FIG. 4B, the electrode 21 or 22 and the workpiece W make contact with each other, and estimates the contact time based on the change of the tendency of a variation (an inclination, the amount of variation per unit time) in the torque characteristic of the robot axis motor 15 (S4). For example, the contact position estimation unit 34 determines, as shown in FIG. 5, two approximate straight lines L1 and L2 whose inclinations are different in the torque characteristic, and estimates the intersection thereof as the contact time.

Then, the contact position estimation unit 34 estimates, based on the chronological data of the position of the robot 10 and the chronological data of the position of the gun axis stored in the storage unit 31, the position of the robot 10 and the position of the gun axis corresponding to the estimated contact time as the contact position of the electrode 21 or 22 and the workpiece W (S5).

The position compensation unit 35 compensates, based on the contact position estimated in the contact position estimation unit 34, the point (target position) in the work program (S6). For example, before the automatic operation, the position compensation unit 35 may compensate the point (target position) in the work program stored in the storage unit 31. Here, the welding gun controller 40 may also compensate, based on the contact position estimated in the contact position estimation unit 34, the point (target position) in the work program.

Alternatively, the position compensation unit 35 may compensate, during the automatic operation, the point (target position) in the work program so as to compensate the operation command calculated in the operation control unit 32. Here, the welding gun controller 40 may also compensate, based on the contact position estimated in the contact position estimation unit 34, the point (target position) in the work program so as to compensate the operation command.

As described above, in the robot controller 30A and the spot welding system 1 according to the first embodiment, based on the change of the tendency of a variation (an inclination, the amount of variation in torque per unit time) in the torque characteristic of the robot axis motor 15, the contact position of the electrode 21 or 22 in the spot welding gun 20 and the workpiece W is estimated, and based on the estimated contact position, the point (target position) of the robot 10 is compensated. Since as described above, not the torque information of the gun axis motor but the torque information of the robot axis motors 15 is used, the present invention can also be applied to a spot welding system that individually includes the robot controller 30A and the welding gun controller 40 (which is advantageous as compared with patent documents 1 and 2). Since based on the change of the tendency of a variation (an inclination, the amount of variation in torque per unit time) in the torque characteristic of the robot axis motors 15, the instant of contact of the electrode 21 or 22 in the spot welding gun 20 and the workpiece W is monitored, it is possible to accurately detect the contact position (which is advantageous as compared with patent documents 3 and 4).

(Robot Controller According to Second Embodiment)

When the operation of closing the spot welding gun 20 is performed, as shown in FIG. 5, fluctuations (variations) are produced in the current and the torque of the servo motor. Although a fluctuation produced in the torque of the robot axis motor tends to be larger than a fluctuation produced in the torque of the gun axis motor, a fluctuation produced in the torque of a wrist axis motor among the robot axis motors tends to be smaller than a fluctuation produced in the torque of a basic axis motor. Hence, in the contact position estimation unit 34 described above, the torque of the wrist axis motor is used to enhance the accuracy of estimation of the contact position. On the other hand, when in the contact position estimation unit 34, the torque of the basic axis motor is used, the change of the tendency of a variation in the torque of the robot axis motor is embedded in the fluctuation, and thus the accuracy of estimation of the contact position is not enhanced, and furthermore, contact may be erroneously detected.

In this regard, there is a method of restricting the torque (that is, the drive current) of the robot axis motor which greatly contributes to the deformation of the workpiece. In this way, when the electrode and the workpiece make contact with each other, an increase in the torque of the robot axis motor can be restricted, and thus it is possible to reduce the deformation of the workpiece. This torque restricting method is effective for the basic axis motor which has the problem described above. On the other hand, the torque restricting method is often not effective for the wrist axis motor for the following reason. Specifically, depending on the posture of the robot, even when the torque of the wrist axis motor is restricted, the opposite effect is produced, with the result that when the electrode and the workpiece make contact with each other, it may be accelerated instead of being stopped.

Furthermore, the magnitude of influence of a reaction force which is received by each robot axis from the workpiece when the electrode and the workpiece make contact with each other, that is, the magnitude of the change of the tendency of a variation (an inclination) in the torque is varied depending on the posture of the robot. Furthermore, one of the six robot axes which is greatly affected by the reaction force is changed depending on the posture of the robot.

Hence, in the present embodiment, when the axis which is greatly affected by the reaction force from the workpiece when the electrode and the workpiece make contact with each other is the wrist axis, the accuracy of estimation of the contact position is enhanced by the contact position estimation unit 34 described above with the torque of the wrist axis motor. On the other hand, when the axis which is greatly affected by the reaction force from the workpiece when the electrode and the workpiece make contact with each other is not the wrist axis due to the posture of the robot, if the basic axis which is greatly affected by the reaction force from the workpiece is present, the torque of the basic axis motor is restricted.

Figure 6:
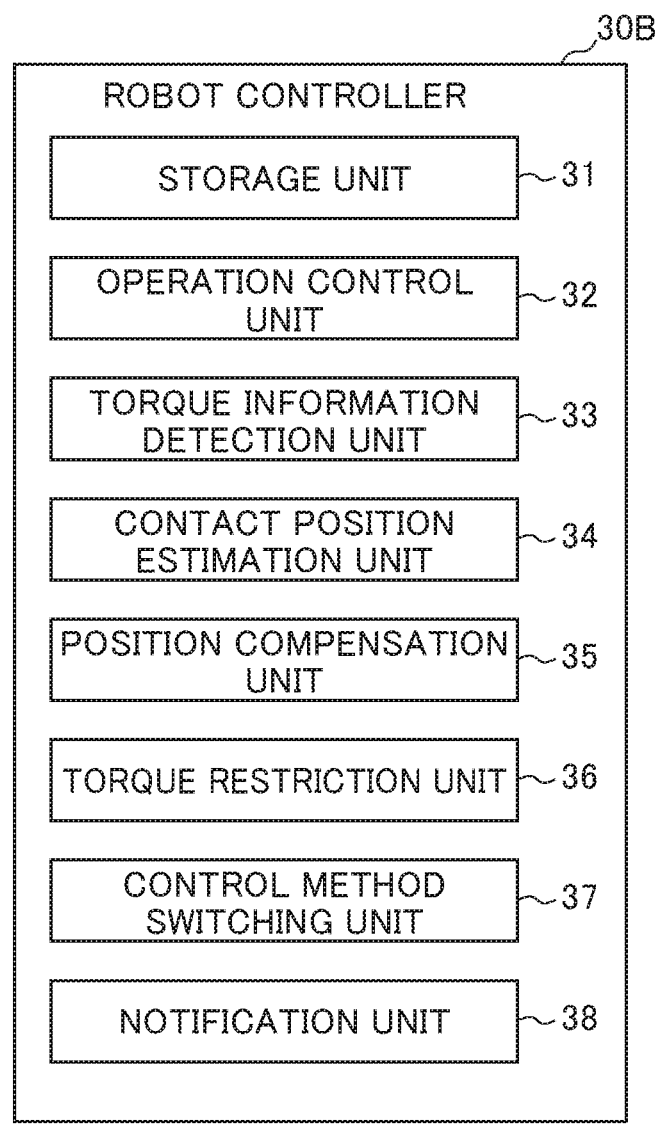
FIG. 6 is the robot controller shown in FIG. 1 and is a diagram showing the configuration of a robot controller according to a second embodiment.

FIG. 6 is a diagram showing the configuration of a robot controller according to a second embodiment. The robot controller 30B shown in FIG. 6 is applied to the robot controller 30 in the spot welding system 1 shown in FIG. 1. The robot controller 30B differs from the robot controller 30A shown in FIG. 2 in that the robot controller 30B further includes a torque restriction unit 36, a control method switching unit 37 and a notification unit 38.

The torque restriction unit 36 restricts the torques of the robot axis motors 15 in the robot 10. A plurality of torque restriction units 36 may be respectively provided for the robot axis motors 15.

The control method switching unit 37 estimates, according to the work program, based on the posture of the robot 10 positioned in the point (target position), an S/N ratio between moment S which is received by the robot axis when the spot welding gun 20 is closed such that the electrode 21 or 22 and the workpiece W make contact with each other and a fluctuation N which is produced in the robot axis motors 15. The control method switching unit 37 switches control methods based on the estimated S/N ratio.

Specifically, when a robot axis (a drive axis, for example, a wrist axis) is present in which the estimated S/N ratio is equal to or more than a first switching threshold value, the control method switching unit 37 estimates the contact position of the workpiece W and the electrode 21 or 22 with the contact position estimation unit 34 based on the change of the tendency of a variation in the torque characteristic of the robot axis, and compensates the target position (point) of the robot 10 with the position compensation unit 35 (contact detection method). On the other hand, when the robot axis is not present in which the estimated S/N ratio is equal to or more than the first switching threshold value, and a basic axis is present in which the estimated S/N ratio is equal to or more than a second switching threshold value, the control method switching unit 37 restricts the torque of the basic axis with the torque restriction unit 36 (torque limit method).

When the robot axis is not present in which the estimated S/N ratio is equal to or more than the first switching threshold value, and the basic axis is also not present in which the estimated S/N ratio is equal to or more than the second switching threshold value, the control method switching unit 37 makes the notification unit 38 provide an alarm notification.

The notification unit 38 is, for example, a communication interface, and provides the alarm notification to a teach pendant or the like.

Figure 7:
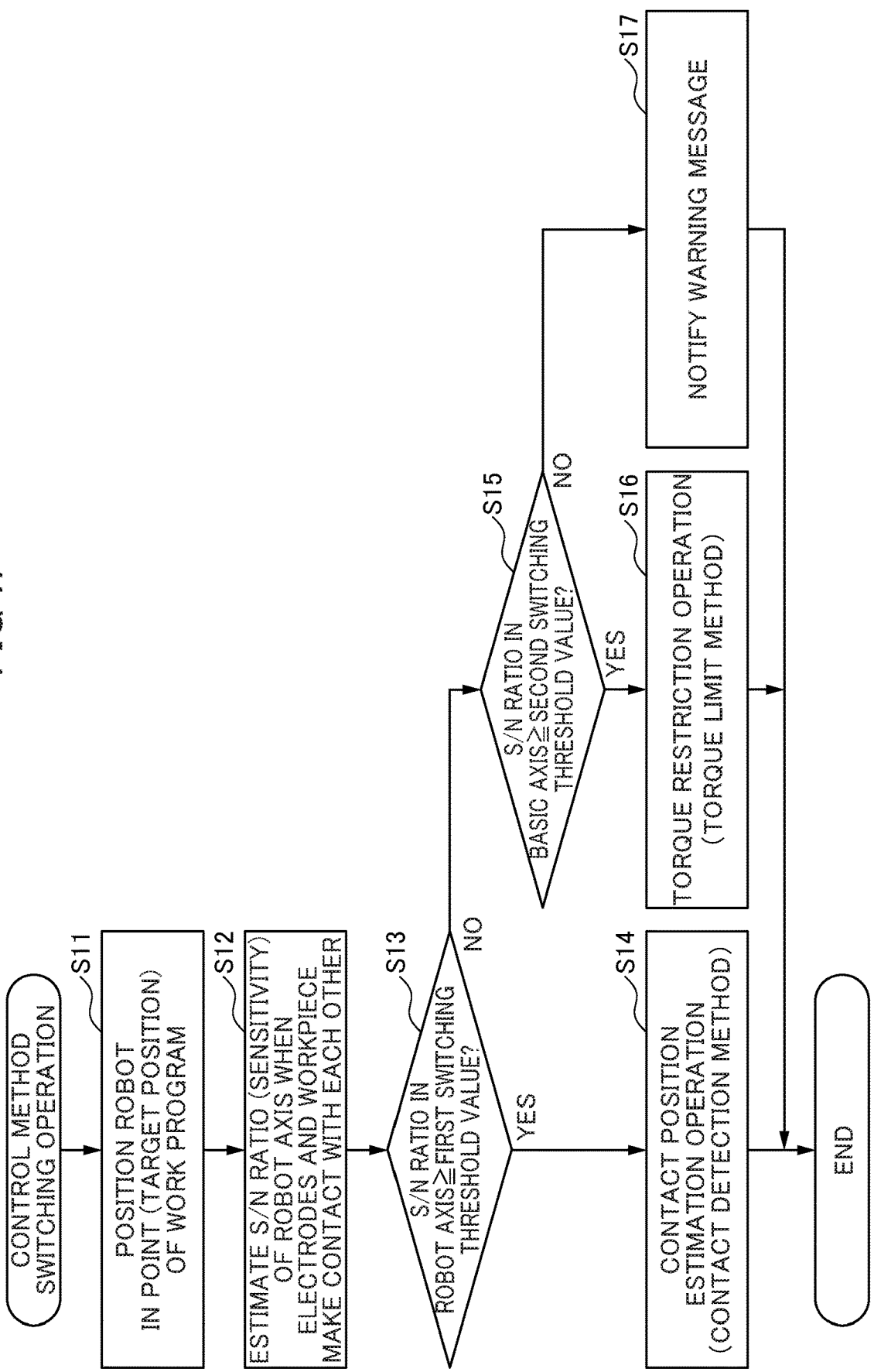
FIG. 7 is a flowchart of a control method switching operation performed by the robot controller according to the second embodiment.

A control method switching operation which is performed before the automatic operation by the robot controller 30B according to the second embodiment will then be described with reference to FIG. 7. Alternatively, the control method switching operation by the robot controller 30B can also be performed during the automatic operation. FIG. 7 is a flowchart of the control method switching operation performed by the robot controller 30B according to the second embodiment.

As in step S1 of FIG. 3 described previously, the operation control unit 32 operates the robot 10 according to the work program so as to relatively move the workpiece W and the spot welding gun 20, and positions the robot 10 such that the spot welding gun 20 is arranged in the point (target position) of the workpiece W (S11). Here, the spot welding gun 20 is in a state where the spot welding gun 20 is opened.

Then, when it is assumed that a unit reaction force is applied from the workpiece W to the electrode 21 or 22 as a result of contact of the electrode 21 or 22 and the workpiece W, the control method switching unit 37 calculates moment S which is received by each robot axis in the posture of the robot 10 that is positioned. The control method switching unit 37 estimates a fluctuation N which is produced in each robot axis in the posture of the robot 10 that is positioned. The control method switching unit 37 estimates an S/N ratio (hereinafter also referred to as sensitivity) between the moment S and the fluctuation N which are determined (S12).

Then, the control method switching unit 37 determines whether or not the S/N ratio in any of the robot axes (for example, a wrist axis) is equal to or more than the first switching threshold value (S13). When the S/N ratio in any of the robot axes is equal to or more than the first switching threshold value, the control method switching unit 37 selects the contact detection method so as to perform the contact position estimation operation of steps S2 to S6 of FIG. 3 described above (S14). When two or more robot axes are present in which the S/N ratio is equal to or more than the first switching threshold value, the contact position estimation may be performed on the robot axis whose S/N ratio is the largest. Alternatively, the contact position estimation may be performed on each of the robot axes.

When the S/N ratios in all the robot axes are less than the first switching threshold value, the control method switching unit 37 determines whether or not an S/N ratio in any of the basic axes is equal to or more than the second switching threshold value (S15). When the S/N ratio in any of the basic axes is equal to or more than the threshold value, the control method switching unit 37 selects the torque limit method (S15). In this way, at the time of the automatic operation, the torque restriction unit 36 restricts the torque generated in the operation control unit 32. When two or more basic axes are present in which the S/N ratio is equal to or more than the second switching threshold value, the torque restriction may be performed on the basic axis whose S/N ratio is the largest.

When the S/N ratios in all the basic axes are also less than the second switching threshold value, the control method switching unit 37 determines that neither the contact detection method nor the torque limit method is appropriate in the current posture, and makes the notification unit 38 provide a notification of a warning message so as to prompt a user to change the posture of the robot 10. For example, the notification unit 38 may provide a notification to a teach pendant so as to display the warning message on a display portion of the teach pendant.

In the robot controller 30B and the spot welding system 1 of the second embodiment, the same advantage as in the robot controller 30A and the spot welding system 1 of the first embodiment can be obtained.

Furthermore, in the robot controller 30B and the spot welding system 1 of the second embodiment, when a robot axis (a drive axis, for example, a wrist axis) is present in which the estimated S/N ratio is equal to or more than the first switching threshold value, the robot axis is used, the contact detection method by the contact position estimation unit 34 is adopted and thus the accuracy of estimation of the contact position is enhanced. On the other hand, when the robot axis is not present in which the estimated S/N ratio is equal to or more than the first switching threshold value, and a basic axis is present in which the estimated S/N ratio is equal to or more than the second switching threshold value, the basic axis is used, and the torque limit method is adopted. As described above, the contact detection method and the torque limit method are selectively used according to the posture of the robot 10, and thus it is possible to cope with a larger number of postures of the robot 10.

Although the embodiments of the present invention are described above, the present invention is not limited to the embodiments described above. The effects described in the present embodiment are simply a list of the most preferred effects produced from the present invention, and the effects of the present invention are not limited to those described in the present embodiment.

Figure 8:
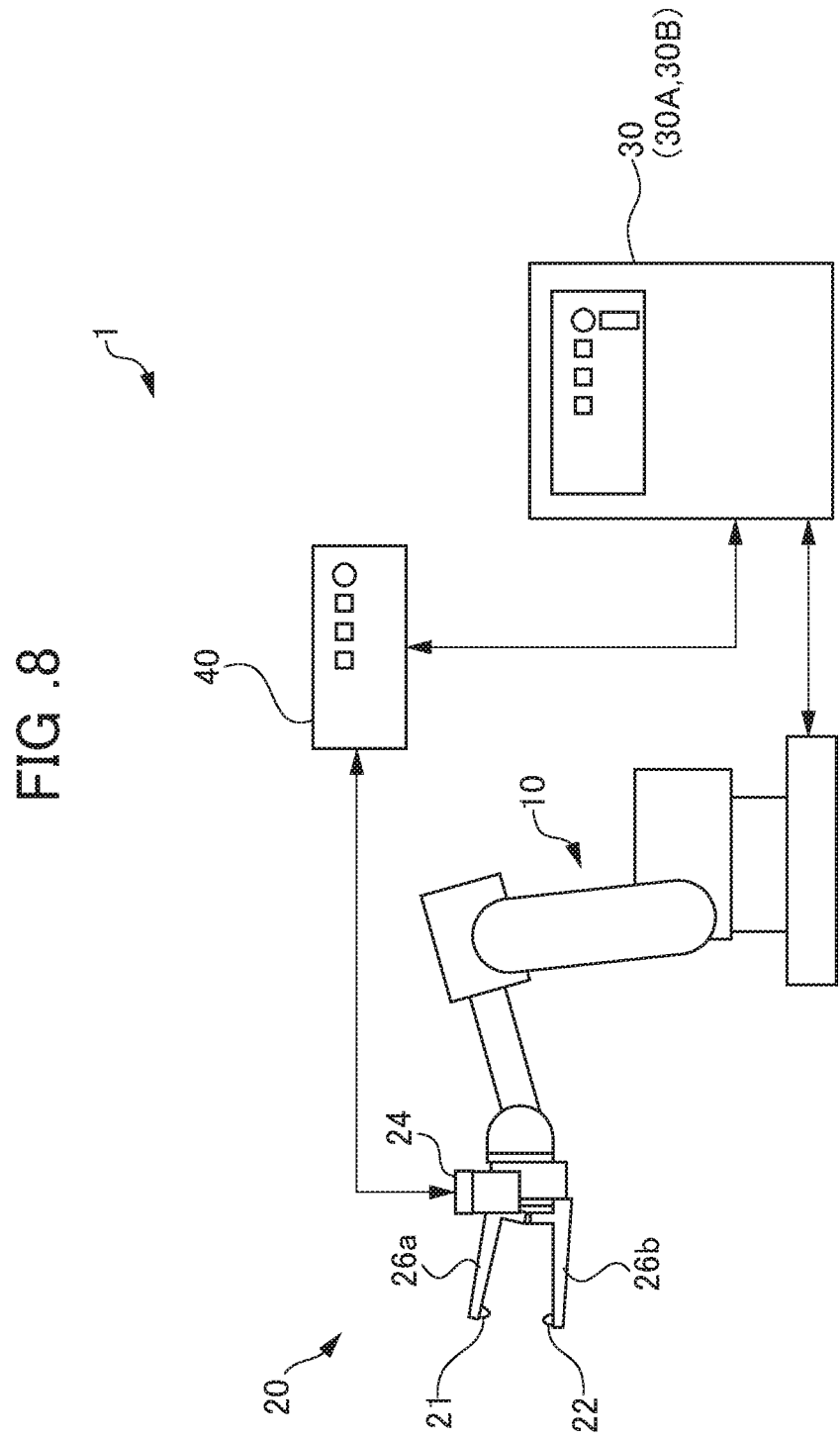
FIG. 8 is a diagram showing the configuration of a spot welding system according to a variation of the present embodiment.

For example, in the embodiments described above, the spot welding system 1 including the C-type spot welding gun 20 is illustrated. However, the feature of the present invention is not limited to this configuration, and spot welding systems including various spot welding guns can be applied. For example, as shown in FIG. 8, the present invention can also be applied to a spot welding system which includes a so-called X-type spot welding gun that includes: a pair of gum arms 26a and 26b which can be opened and closed; and a movable electrode 21 and an opposite electrode 22 which are attached to the tip end portions of the gum arms 26a and 26b.

Figure 9:
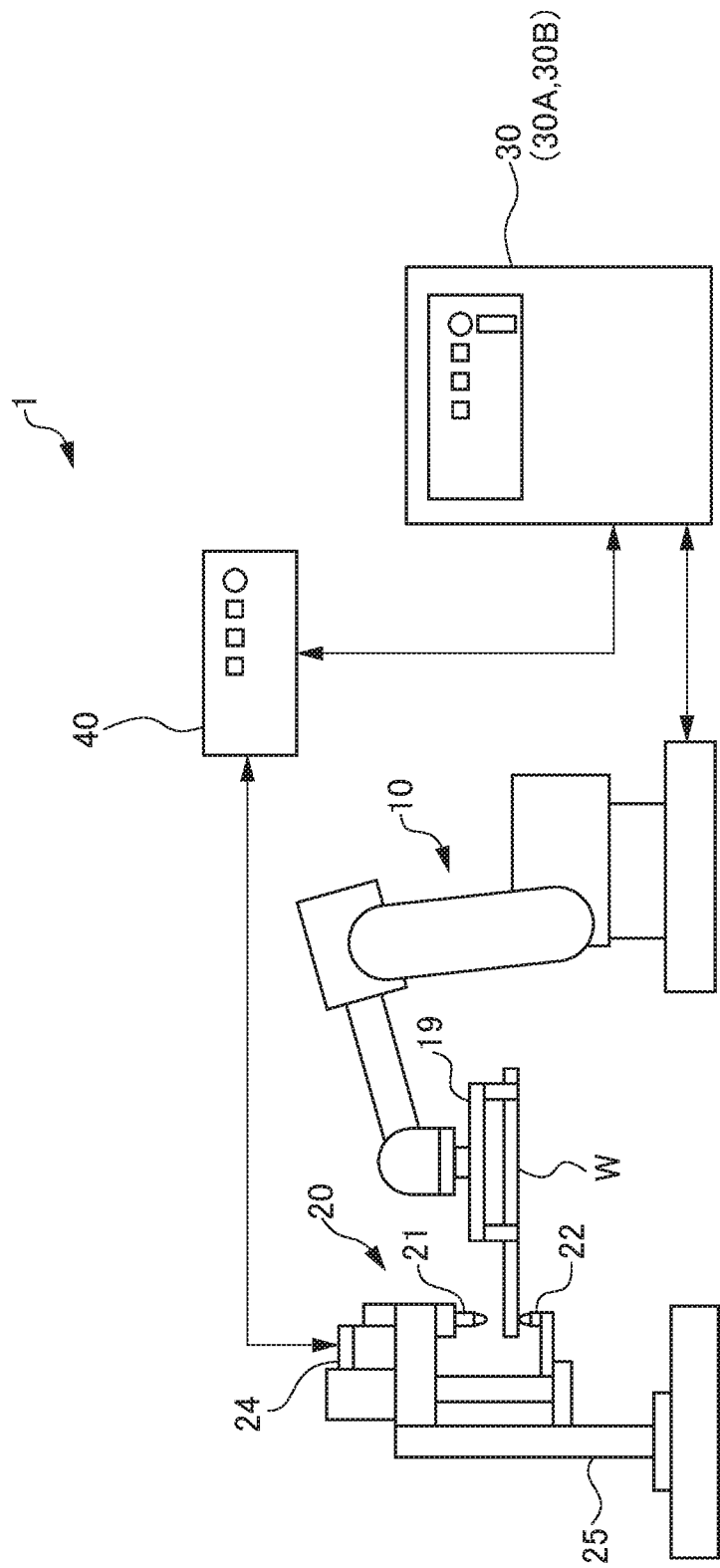
FIG. 9 is a diagram showing the configuration of a spot welding system according to another variation of the present embodiment.

In the embodiments described above, the workpiece W is installed so as to be fixed, the spot welding gun 20 is attached to the arm tip end portion 14 of the robot 10 and thus the spot welding gun 20 is relatively moved with respect to the workpiece W. However, the spot welding gun 20 is installed so as to be fixed, and the workpiece W is retained at the arm tip end portion 14 of the robot 10, with the result that the spot welding gun 20 may be relatively moved with respect to the workpiece W. For example, as shown in FIG. 9, the spot welding gun 20 is supported with a gun stand 25 which is installed in a predetermined position, and the workpiece W is retained with the arm tip end portion of the robot 10 through a robot hand 19, with the result that the workpiece W may be relatively moved by the drive of the robot 10 with respect to the spot welding gun 20 such that the workpiece W is arranged between the electrodes 21 and 22.

Although in the embodiments described above the spot welding system is illustrated, there is no limitation to this configuration. The feature of the present invention can be applied to robot control in various robot systems in which a processing tool is brought into contact with a target to be processed and in which predetermined processing is performed on the target to be processed.

EXPLANATION OF REFERENCE NUMERALS 1 spot welding system (robot system)
10 robot
11 base
12 lower arm
13 upper arm
14 arm tip end portion
15 servo motor (drive unit)
15a encoder
20 spot welding gun (processing tool)
21 movable electrode
22 opposite electrode
23 gum arm
23a frame
24 servo motor
24a encoder
30, 30A, 30B robot controller
31 storage unit
32 operation control unit
33 torque information detection unit
34 contact position estimation unit
35 position compensation unit
36 torque restriction unit
37 control method switching unit
38 notification unit
40 welding gun controller
J1 first axis (drive axis, basic axis)
J2 second axis (drive axis, basic axis)
J3 third axis (drive axis, basic axis)
J4 fourth axis (drive axis, wrist axis)
J5 fifth axis (drive axis, wrist axis)
J6 sixth axis (drive axis, wrist axis)
W workpiece (target to be processed)

What is claimed is:

1. A robot system which brings a processing tool into contact with a target to be processed so as to perform predetermined processing on the target to be processed, the robot system comprising:
an articulated type robot which retains the target to be processed or the processing tool at an arm tip end portion and which includes a plurality of drive units that drive a plurality of drive axes; and
a robot controller which controls, based on a target position of the robot, the drive units of the robot so as to control a relative position of the target to be processed and the processing tool,
wherein the drive axes of the robot include a wrist axis on a side of the arm tip end portion and a basic axis on a side opposite to the arm tip end portion,
wherein the robot controller includes:
a torque information detection unit which detects torque information on torques of the drive units in the robot;
a contact position estimation unit which estimates, based on a change of tendency of a variation in the torque information of at least one of the drive units detected in the torque information detection unit, a contact position in which the target to be processed and the processing tool make contact with each other;
a position compensation unit which compensates the target position of the robot based on the contact position estimated in the contact position estimation unit,
a torque restriction unit which restricts at least one of the torques of the drive units; and
a control method switching unit which estimates, based on a posture of the robot in the target position, an S/N ratio between moment S that is received by the drive axes when the target to be processed and the processing tool make contact with each other and a fluctuation N that is produced in the drive axes, and which switches control method which compensates the target position of the robot with the position compensation unit and control method which restricts the torque of the basic axis with the torque restriction unit based on the estimated S/N ratio.

2. The robot system according to claim 1, wherein
when a drive axis is present in which the estimated S/N ratio is equal to or more than a first switching threshold value, the control method switching unit estimates the contact position of the target to be processed and the processing tool with the contact position estimation unit, and compensates the target position of the robot with the position compensation unit
whereas when the drive axis is not present in which the estimated S/N ratio is equal to or more than the first switching threshold value, the control method switching unit restricts a torque of the basic axis with the torque restriction unit.

3. The robot system according to claim 2, wherein when the drive axis is not present in which the estimated S/N ratio is equal to or more than the first switching threshold value, and a basic axis is present in which the estimated S/N ratio is equal to or more than a second switching threshold value, the control method switching unit restricts the torque of the basic axis with the torque restriction unit.

4. The robot system according to claim 3, further comprising: a notification unit which provides an alarm notification,
wherein when the drive axis is not present in which the estimated S/N ratio is equal to or more than the first switching threshold value, and the basic axis is not present in which the estimated S/N ratio is equal to or more than the second switching threshold value, the control method switching unit makes the notification unit provide the alarm notification.

5. The robot system according to claim 1, wherein the change of the tendency of the variation in the torque information is a change of an amount of variation in the torque information per unit time.

6. The robot system according to claim 1, wherein the torque information is the torques or drive currents of the drive units.

7. The robot system according to claim 1, wherein the robot system is a spot welding system which includes a spot welding gun as the processing tool and which performs spot welding on a workpiece serving as the target to be processed.

* * * * *